(12) United States Patent
Li et al.

(10) Patent No.: US 7,455,004 B2
(45) Date of Patent: Nov. 25, 2008

(54) APPARATUS AND METHOD FOR CUTTING SHEET MATERIAL

(75) Inventors: Ming M. Li, Murrysville, PA (US); Hongbing Lu, Edmond, OK (US); James M. Rushing, Maryville, TN (US); Dennis P. Henninger, Newburgh, IN (US); Xingyun Shen, Bettendorf, IA (US)

(73) Assignee: Alcoa Inc., Pittsburgh, PA (US)

( * ) Notice: Subject to any disclaimer, the term of this patent is extended or adjusted under 35 U.S.C. 154(b) by 100 days.

(21) Appl. No.: 10/383,180

(22) Filed: Mar. 6, 2003

(65) Prior Publication Data

US 2004/0173067 A1    Sep. 9, 2004

(51) Int. Cl.
*B26D 1/24* (2006.01)

(52) U.S. Cl. .............................. 83/495; 83/496; 83/663; 83/673; 83/676

(58) Field of Classification Search .................... 83/694, 83/496, 663, 676, 495, 500, 346, 673
See application file for complete search history.

(56) References Cited

U.S. PATENT DOCUMENTS

| | | | | |
|---|---|---|---|---|
| 559,179 A * | 4/1896 | Koegel | 83/497 |
| 976,757 A * | 11/1910 | Sylvester | 83/410 |
| 1,345,802 A * | 7/1920 | Munschauer | 239/581.1 |
| 3,292,478 A * | 12/1966 | Falk et al. | 83/679 |
| 3,411,208 A * | 11/1968 | Malm | 30/350 |
| 3,459,086 A * | 8/1969 | Reeder, Jr. | 83/78 |
| 3,570,353 A | 3/1971 | Thomas | |
| 3,612,367 A * | 10/1971 | Benz et al. | 225/97 |
| 3,788,180 A * | 1/1974 | Potsch et al. | 83/449 |
| 3,813,981 A * | 6/1974 | Faltin | 83/500 |
| 3,929,044 A | 12/1975 | Beauchet | |
| 4,061,063 A * | 12/1977 | Brush | 83/55 |
| 4,271,319 A * | 6/1981 | Frye et al. | 83/430 |
| 4,274,319 A | 6/1981 | Frye et al. | |
| 4,380,945 A * | 4/1983 | Guild et al. | 83/482 |
| 4,414,874 A * | 11/1983 | Barnes et al. | 83/488 |
| 4,614,142 A | 9/1986 | Fritz et al. | |
| 4,972,750 A | 11/1990 | Paavola | |
| 5,370,026 A * | 12/1994 | Cavagna | 83/478 |
| 5,820,999 A | 10/1998 | Li et al. | |
| 5,974,922 A * | 11/1999 | Camp et al. | 83/37 |
| 5,988,033 A * | 11/1999 | Skaar et al. | 83/596 |
| 6,267,033 B1 | 7/2001 | Gundlach et al. | |
| 6,394,330 B1 * | 5/2002 | Jackson | 225/2 |
| 6,408,729 B1 * | 6/2002 | Johnson | 83/697 |
| 6,427,572 B2 * | 8/2002 | Ciani et al. | 83/676 |
| 2002/0017173 A1 | 2/2002 | Li et al. | |
| 2004/0173074 A1 | 9/2004 | Li et al. | |

* cited by examiner

*Primary Examiner*—Boyer D Ashley
*Assistant Examiner*—Omar Flores-Sánchez
(74) *Attorney, Agent, or Firm*—Greenberg Traurig LLP (57) ABSTRACT

The apparatus for trimming sheet material includes a top knife and an opposing bottom knife for trimming sheet or web material passing between the top and bottom knives. The top knife defines a negative rake angle with a substantially vertical plane passing through a cutting edge of the bottom knife. The negative rake angle may be between about −10° and −30° and, more preferably, between about −12° and −20°. The top and bottom knives may be disk or block knives.

3 Claims, 9 Drawing Sheets

RAKE ANGLE=0 DEGREE, CLEARANCE=0.001 INCH, OVERLAP=0.020 INCH

FIG.11A

RAKE ANGLE=-18 DEGREE, CLEARANCE=0.020 INCH, OVERLAP=0.025 INCH

FIG.11B

CLEARANCE=0.001 INCH

FIG.12A

CLEARANCE=0.012 INCH

FIG.12B

CLEARANCE=0.017 INCH

FIG.12C

CLEARANCE=0.020 INCH

APPARATUS AND METHOD FOR CUTTING SHEET MATERIAL

BACKGROUND OF THE INVENTION

1. Field of the Invention

The present invention relates generally to cutting of sheet material and, more particularly, to trimming or slitting of metallic and nonmetallic sheet material, such as aluminum or plastic sheet material, and, even more particularly, relates to a method and apparatus for improving cut edge quality in trimmed sheet material.

2. Description of Related Art

Side or edge trimming and slitting are common processes practiced in flat rolled products (FRP) production facilities. Such trimming and slitting applications or processes include hot line edge trimming, cold mill edge trimming, and side trimming and slitting. These types of processes are generally required for both ingot source products and continuous cast products.

A major concern in the foregoing types of processes is cut edge quality. In the case of trimming or slitting of metal sheet, it is desirable to reduce burrs, fines, debris, and slivers at the cut edge of the metal sheet. The ideal cut edge should be smooth, free of edge waves (i.e., edge buckles), be clean and free from debris (i.e., fines and slivers), and be burr-free. In most cases, high burr is an indication of poor edge quality. Burr may be generally defined as the material deformed out of the sheet or web plane, which is caused during the cutting process. High burr in the cut, trimmed, or slit metal sheet, for example, can affect downstream winding quality. High burr is often unacceptable to end-use customers, such as automotive, aerospace, and rigid packaging, because high burr metal sheet is problematic in their manufacturing processes.

In general, side or edge trimming and slitting operations incorporate either disk-type knives or block-type knives. Disk-type knives are commonly used in edge trimming and slitting operations involving can body sheets, end stock sheets, lithographic sheets, and other light gauge metal sheets and foil products. Block-type knives are commonly used in hot line edge trimming of metal slabs, cold mill edge trimming of metal sheet, and edge trimming and slitting of medium and medium to heavy gauge metal sheet. In addition to the edge quality issues discussed hereinabove, other important considerations in edge trimming and slitting processes are knife life, knife setup time, and knife changeover time.

Attempts have been made in the prior art to improve both cut edge quality and knife life and performance in the cutting of sheet material, typically metal sheet. One such example is found in U.S. Pat. No. 4,614,142 to Fritz et al., which is incorporated herein by reference. This reference discloses circular cutting shears for longitudinal edging of metal plates and sheets. The cutting shears include upper and lower circular cutters. The upper cutter is inclined towards the surface of the plate or sheet passing between the upper and lower cutters. The upper cutter generally forms an acute angle with the surface of the plate or sheet being cut. In particular, the upper cutter defines a positive rake angle, as defined hereinafter, with respect to the lower cutter. The arrangement of the upper and lower cutters insures that the top cutter runs free from the cut edge of the plate or sheet and that the edges of the cut plate or sheet are spread apart.

U.S. Pat. No. 5,820,999 to Li et al. discloses a method and apparatus for reducing or eliminating sliver formation during aluminum sheet trimming operations for aluminum sheet destined for use in motor vehicles. In general, this reference discloses orienting the aluminum sheet at a cutting angle of at least about 10° with respect to a cutting blade. The cutting angle is measured from a plane generally perpendicular to a cutting direction of the cutting blade. The apparatus and method disclosed in the Li et al. patent cuts the aluminum sheet in discreet trimming operations. The aluminum sheet is not trimmed in a continuous process. The Li et al. patent is incorporated herein by reference. A similar apparatus and method to that disclosed in the Li et al. patent is found in United States Patent Application Publication No. U.S. 2002/0017173, which is also incorporated herein by reference.

In view of the foregoing, a need continues to exist to improve cut edge quality, particularly in edge or side trimming or slitting operations in FRP plants. In addition to improved edge quality, a need exists to improve knife-life and performance in such edge trimming or slitting operations. In particular, a need exists to improve cut edge quality in side trimming or slitting operations involving metal sheet, such as aluminum sheet. Moreover, a need exists to provide a trimming/slitting apparatus and process that is more robust than prior art apparatuses and process, allowing increased clearance between the upper and lower cutters and the use of duller cutting blades or edges.

SUMMARY OF THE INVENTION

The foregoing needs are accomplished with a knife arrangement for trimming sheet or web material and method of trimming web material in accordance with the present invention. In one embodiment, the knife arrangement comprises a top knife and an opposing bottom knife for trimming sheet or web material passing between the top and bottom knives. The top knife defines a negative rake angle with a substantially vertical plane passing through a cutting edge of the bottom knife.

The top knife preferably defines a negative rake angle of between about −10° and −30° with the substantially vertical plane. More particularly, the top knife preferably defines a negative rake angle of between about −12° and −20° with the substantially vertical plane. The top and bottom knives may comprise disk or block knives.

The top and bottom cutting knives may be spaced apart horizontally by a clearance gap of up to about 350% of web material thickness. The top and bottom knives may overlap at least partially in the vertical direction. The overlap may be between about 25% and 800% of web material thickness.

The web material generally lies in a substantially horizontal plane when passing between the top and bottom knives. The top knife may define a cant angle with the bottom knife when viewed in a direction substantially perpendicular to the substantially horizontal plane. The cant angle may be in the range of between about −0.25° and 1°. The top and bottom knives may be specifically adapted to trim metal sheet material, such as aluminum or steel metal sheet, foil, or thin plate.

The top knife may be a disk knife adapted to trim the web material. The top disk knife may comprise a cutting edge defined by first and second substantially planar surfaces. The first and second surfaces define an acute angle therebetween, which forms the cutting edge. The first surface is formed at an angle α of between about 10° and 30° with respect to a substantially horizontal plane passing through the cutting edge. The second surface is formed at an angle γ of between about 60° and 80° with respect to the substantially horizontal plane. The second surface extends a projected distance t of between about 0.001 to 0.080 inch as measured along the substantially horizontal plane.

The top disk knife may further comprise a third surface adjacent the first surface and formed at an angle θ of between about 45° and 65° with respect to the substantially horizontal plane. The first surface may be formed at an angle α of between about 10° and 20° with respect to the substantially horizontal plane. The second surface may be formed at an angle γ of between about 70° and 80° with respect to the substantially horizontal plane. The second surface may extend a projected distance t of between about 0.003 to 0.060 inch along the substantially horizontal plane.

The bottom knife may also be a disk knife adapted to trim the web material. The bottom disk knife is located opposite the top disk knife. A cutting edge of the bottom disk knife may be defined by a cutting surface formed at an angle ψ of between about 3° and 10° with respect to a substantially vertical plane passing through the cutting edge of the bottom disk knife.

The top knife may be a block knife adapted to trim the web material. The top block knife has a cutting edge defined by first and second substantially planar surfaces. The first and second surfaces define an acute angle therebetween forming the cutting edge. The first surface is formed at an angle α of between about 10° and 45° with respect to a substantially horizontal plane passing through the cutting edge. The second surface is formed at an angle γ of between about 60° and 80° with respect to the substantially horizontal plane. The second surface may extend a projected distance t of between about 0.001 to 0.080 inch as measured along the substantially horizontal plane. The first surface may be formed at an angle α of between about 10° and 20° with respect to the substantially horizontal plane. The second surface may be formed at an angle γ of between about 70° and 80° with respect to the substantially horizontal plane. The second surface may extend a projected distance t of between about 0.003 to 0.060 inch along the substantially horizontal plane.

The bottom knife may also be a block knife adapted to trim the web material. The bottom block knife is located opposite the top block knife. A cutting edge of the bottom block knife may be defined by a cutting surface formed at an angle ψ of between about 3° and 10° with respect to a substantially vertical plane passing through the cutting edge of the bottom block knife.

Further, the present invention is a method of trimming web material, such as metal, plastic, paper, or cloth material. The web material may be, for example, metal sheet, foil or thin plate. The method generally comprises cutting the web material between a top knife and an opposing bottom knife. The top knife defines a negative rake angle with a substantially vertical plane passing through a cutting edge of the bottom knife. Preferably, the negative rake angle is between about −10° and −30° and, more preferably, −12° and −20°. The top and bottom knives may be spaced apart horizontally by a clearance gap, which may be up to about 350% of web material thickness. The top and bottom knives may overlap at least partially in the vertical direction, preferably between about 25% and 800% of web material thickness. The top knife may define a cant angle with the bottom knife. The cant angle is preferably in the range of between about −0.25° and 1°. The web material may be metal sheet, foil, or thin plate, such as aluminum sheet, foil, or thin plate. The metal sheet, foil, or thin plate may have a thickness of less than about 1 inch.

The method may be applied specifically to trimming metal sheet, foil, or thin plate, and may include the steps of: providing a top knife and an opposing bottom knife, each adapted to trim metal sheet material; passing the metal sheet material between the top and bottom knives; and cutting the metal sheet material between the top and bottom knives. The top knife defines a negative rake angle with a substantially vertical plane passing through a cutting edge of the bottom knife.

The top knife may define a negative rake angle of between about −10° and −30° with the substantially vertical plane and, more preferably, between about −12° and −20°. The top and bottom knives may be spaced apart horizontally by a clearance gap of up to about 350% of metal sheet material thickness. The top and bottom knives may overlap in the vertical direction to a distance of between about 25% and 800% of metal sheet material thickness. The top knife may define a cant angle in the range of between about −0.25° and 1° with the bottom knife.

The metal sheet material may comprise metal sheet, foil, or thin plate, such as aluminum sheet, foil, or thin plate. Such aluminum sheet, foil, or thin plate may be formed of an aluminum alloy selected from any alloy in the 1XXX to 8XXX series aluminum alloys as designated by the Aluminum Association. The metal sheet material may have a thickness of less than about 1 inch. The method may further comprise the steps of unwinding the metal sheet material from a supply roll prior to passing the metal sheet material between the top and bottom knives, and winding the trimmed metal sheet material on a recovery roll after cutting the metal sheet material between the top and bottom knives.

The present invention is further a trimmed length of web material, preferably metal sheet material that is substantially free of burrs, fines, debris, and slivers. The trimmed metal sheet material may comprise aluminum sheet material that is substantially free of burrs, fines, debris, and slivers produced by cutting the aluminum sheet material between top and bottom knives in accordance with the present invention. The top knife defines a negative rake angle with a substantially vertical plane passing through the cutting edge of the bottom knife. The aluminum sheet material may comprise aluminum sheet, foil, or thin plate and having a thickness of less than about 1 inch.

Further details and advantages of the present invention will become apparent from the following detailed description when read in conjunction with the drawings, wherein like parts are designated with like reference characters throughout.

DESCRIPTION OF THE PREFERRED EMBODIMENTS

For purposes of the description hereinafter, the terms "upper", "lower", "right", "left", "vertical", "horizontal", "top", "bottom", and derivatives thereof shall relate to the invention, as it is oriented in the drawing figures. However, it is to be understood that the invention may assume various alternative variations and step sequences except where expressly specified to the contrary. It is also to be understood that the specific devices and processes illustrated in the attached drawings and described in the following text are simply exemplary embodiments of the invention. Hence, specific dimensions and other physical characteristics related to the embodiments disclosed hereinafter are not to be considered limiting.

Figure 1A:
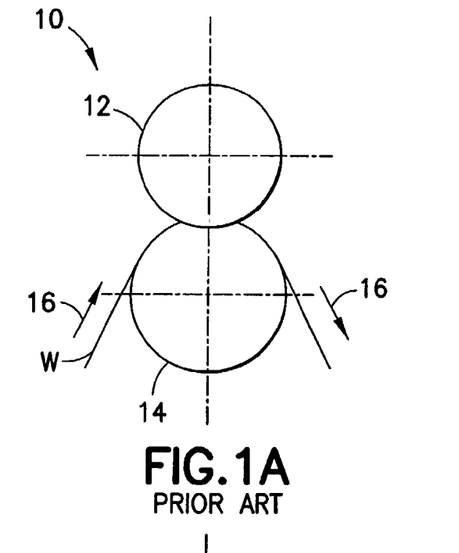
FIG. 1A is a schematic view of a prior art wrap trimming arrangement having top and bottom cutting knives.
Figure 1B:
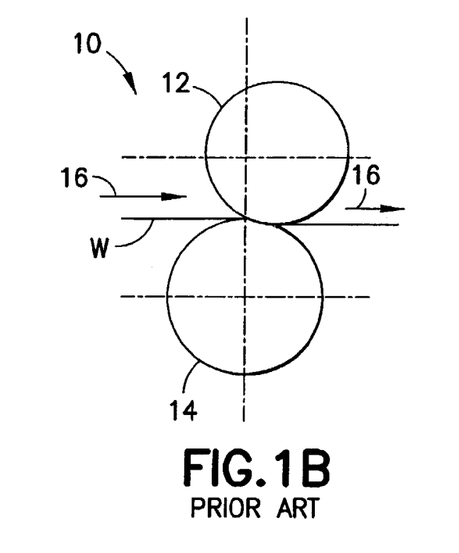
FIG. 1B is a schematic view of a prior art tangential trimming arrangement having top and bottom cutting knives.

FIGS. 1A and 1B illustrate schematically two typical knife arrangements 10 for shear trimming or slitting of web (i.e., sheet) material W, such as metal sheet, which are known in the art. The standard knife arrangements or configurations 10 shown in FIGS. 1A and 1B each include a top or upper knife 12 and a bottom or lower knife 14. FIG. 1A illustrates a typical wrap shear trimming or slitting knife arrangement 10 in which the web material W wraps around the lower blade 14 while moving in the direction of arrows 16. FIG. 1B illustrates a tangential shear trimming or slitting knife arrangement 10 in which the web material W passes substantially straight through or wraps slightly around the lower blade 14, such that the cutting area on the web material W is at an approximate tangent point to the lower blade 14 (i.e., the engaging point between the web material W and lower blade 14). In FIG. 1B, the web material W is again moving in the direction of arrows 16. The present invention, which is discussed hereinafter, is applicable to both tangential and wrap trimming or slitting applications, but will be discussed with reference to tangential trimming or slitting for convenience.

Figure 2:
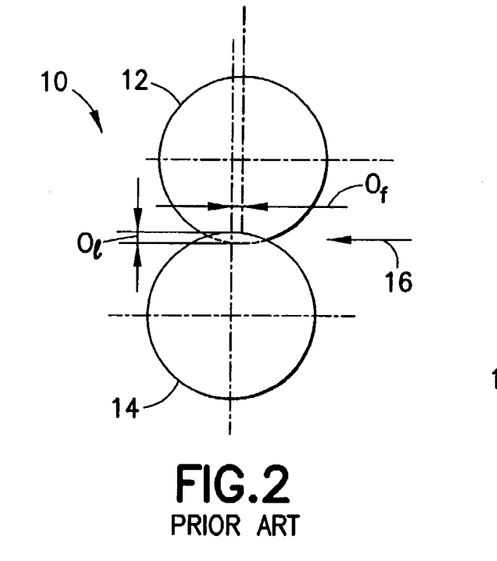
FIG. 2 is a schematic view of the tangential trimming arrangement of FIG. 1B, identifying knife overlap and knife offset parameters in the tangential trimming arrangement.
Figure 3:
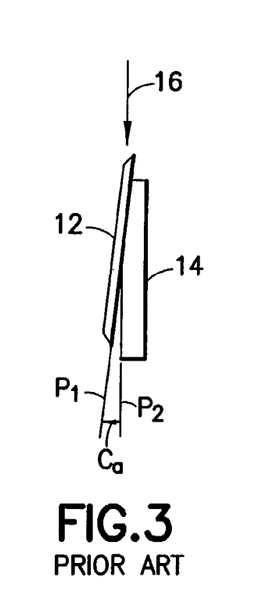
FIG. 3 is schematic top view of the tangential trimming arrangement of FIG. 1B, showing a cant angle defined between the top and bottom knives.
Figure 4:
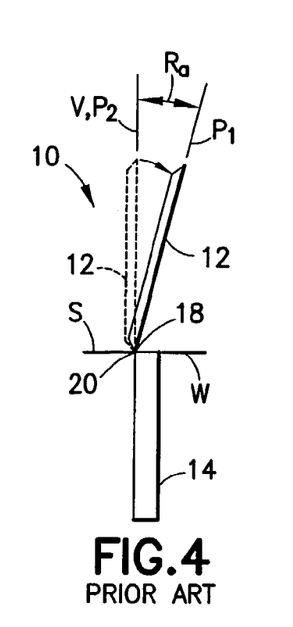
FIG. 4 is a schematic front view of the tangential trimming arrangement of FIG. 1B, showing a positive rake angle defined between the top and bottom knives.

FIGS. 2-4 illustrate schematically and in further detail the known tangential shear trimming or slitting knife arrangement 10. FIGS. 2-4 illustrate and define certain standard parameters and nomenclature used in the art to describe the knife arrangement 10. The top and bottom knives 12, 14 are illustrated as disk-type knives, but may also be block-type knives. The standard nomenclature identified in FIGS. 2-4 will be used to describe the apparatus and method of the present invention, discussed herein. In the knife arrangement 10, the top knife 12 typically overlaps the bottom knife 14. The overlap is designated with reference character $O_l$ in FIG. 2. The overlap $O_l$ may be defined as the height or distance of overlapped area between the top and bottom knives 12, 14. Additionally, in the knife arrangement 10, the top knife 12 is typically offset horizontally from the bottom knife 14. The offset between the top and bottom knives 12, 14 is represented by reference character $O_f$ in FIG. 2. The offset $O_f$ may be defined as the horizontal distance between the axes of rotation of the top and bottom knives 12, 14 (i.e., disk-type knives).

FIG. 3 illustrates a cant angle $C_a$ defined between the top and bottom knives 12, 14, as viewed from above the top and bottom knives 12, 14. The cant angle $C_a$ may be defined as the angle between two cutting edge planes $P_1$, $P_2$, which encompass or pass through the cutting edges or tips 18, 20 (see FIG. 4, discussed hereinafter) of the top and bottom knives 12, 14, respectively, when viewed in a direction substantially perpendicular to the web material W. FIG. 3 illustrates a positive cant angle $C_a$ between the top and bottom knives 12, 14.

FIG. 4 illustrates a rake angle $R_a$ defined between the top and bottom knives 12, 14 as viewed from the front of the knife arrangement 10. In FIG. 4, the rake angle $R_a$ may be defined as the angle between the cutting edge planes $P_1$, $P_2$ encompassing the cutting edges 18, 20 of the top and bottom knives 12, 14, when viewed in a direction substantially parallel to the web material W. In FIG. 4, knife blade plane $P_2$ is coincident with a substantially vertical plane V passing through the cutting edge or tip 20 of the bottom knife 14. Typically, rake angle $R_a$ is defined in the art relative to the vertical plane V, and this standard definition will be used to describe the apparatus and method of the present invention in this disclosure. FIG. 4 illustrates a positive rake angle $R_a$ between the top and bottom knives 12, 14, such as that found in U.S. Pat. No. 4,614,142 to Fritz et al. discussed previously. The dashed representation of the top knife 12 in FIG. 4 denotes a 0° rake angle $R_a$.

Figure 5:
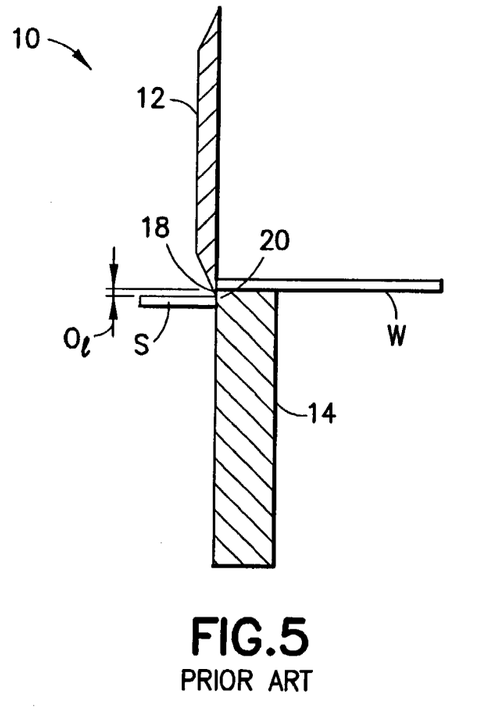
FIG. 5 is a schematic front view of a prior art knife arrangement for cutting web material in the wrap and tangential trimming arrangements of FIGS. 1A and 1B.

Referring further to FIGS. 1-5, the prior art knife arrangement 10 for tangential trimming or slitting of the web material W typically has the top knife 12 oriented at a 0° rake angle $R_a$ relative to the bottom knife 14, as shown in FIG. 5, rather than the positive rake angle $R_a$ illustrated in FIG. 4. The material discarded in the trimming or slitting processes using the knife arrangement 10 is designated with reference character S. The web material W is cut or sheared between the top and bottom knives 12, 14. The known knife arrangement 10 shown, in particular, in FIG. 5 requires tight tolerances on the parameters discussed hereinabove, as well as a very small clearance gap $C_g$ (see FIG. 6, discussed hereinafter) between the top and bottom knives 12, 14. Clearance gap $C_g$ may be defined as the distance between the top and bottom knives 12, 14 in the horizontal direction. In FIG. 5, the clearance gap $C_g$ is substantially zero. In general, the standard tangential trimming knife arrangement 10 shown in FIG. 5 requires a clearance gap $C_g$ of less than about 10% of web material W thickness, when the web material is metal sheet material. For example, for aluminum sheet material, such as 1050-H18 aluminum alloy sheet having a thickness of 0.0058 inch, the clearance gap $C_g$ must be less than 0.001 inch in the knife arrangement 10 in FIG. 5. Additionally, the cant angle $C_a$ for such aluminum sheet material must be between 0° and 0.25° and the overlap $O_l$ less than 0.015 inch. The tight tolerances to which the top and bottom knives 12, 14 must be set makes the standard tangential trimming knife arrangement 10 typically practiced in the art difficult to setup, control, and maintain. Knife blade wear is also a significant operational issue in most flat rolled product plants using this standard configuration.

Figure 6:
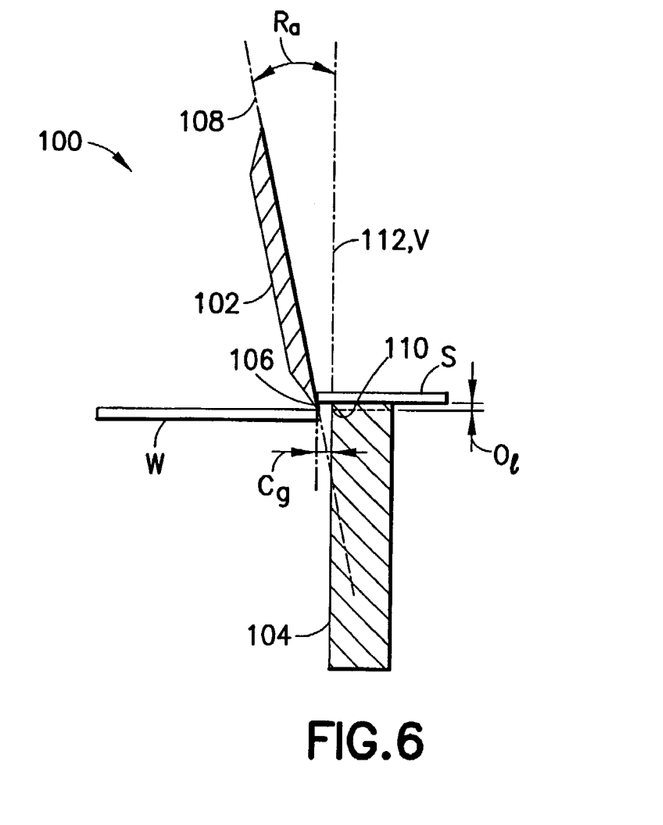
FIG. 6 is a schematic front view of a knife arrangement in accordance with the present invention for cutting web material in the wrap and tangential trimming arrangements of FIGS. 1A and 1B.

Referring to FIG. 6, a knife arrangement 100 for cutting web material W in accordance with the present invention is shown. The knife arrangement 100 of the present invention may be applied to trimming both metallic and non-metallic web materials W. Such non-metallic materials include plastics and the like. Such metallic materials include both ferrous-containing metals such as steel and non-ferrous metals such as aluminum, magnesium, copper, bronze, and the like. The knife arrangement 100 of the present invention is specifically adapted and suited for cutting, trimming, and slitting metal sheet material having a thickness of about 1 inch or less. The metal sheet material may comprise metal sheet, foil, or thin plate (i.e., metal plate having a thickness of about 1 inch or less). As indicated previously, the knife arrangement 100 of the present invention is applicable to both tangential and wrap shear trimming or slitting applications, but will be discussed with reference to tangential trimming or slitting for convenience. The material discarded in the trimming or slitting operations conducted in the knife arrangement 100 is also designated with reference character S in FIG. 6.

Figure 10:
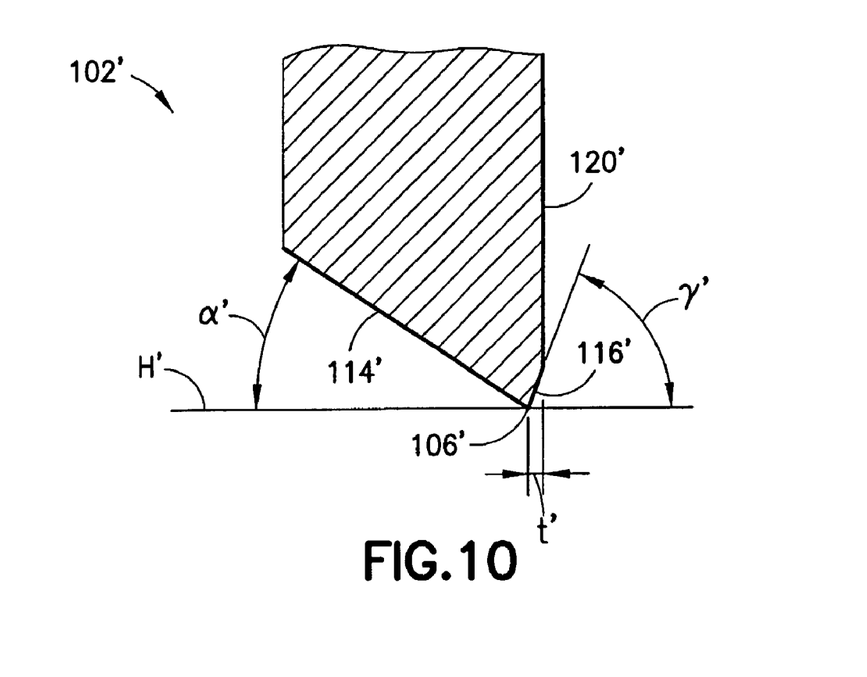
FIG. 10 is a side view of a block-type top knife in accordance with the present invention, which may be used to cut web material in the wrap and tangential trimming arrangements of FIGS. 1A and 1B.

The knife arrangement 100 generally comprises a top knife 102 and an opposing bottom knife 104 for trimming the web material W passing between the top and bottom knives 102, 104. The top and bottom knives 102, 104 are illustrated in FIG. 6 as disk-type knives, but may also be block-type knives. A block-type top knife is illustrated in FIG. 10, discussed hereinafter. The top knife 102 has a cutting edge 106 lying in a top cutting edge plane 108. Similarly, the bottom knife 104 has a cutting edge 110 lying in a bottom cutting edge plane 112, which is coincident with a substantially vertical plane V passing through the cutting edge 110. The top cutting edge plane 108 defines a negative rake angle $R_a$ with the bottom cutting edge plane 112, V in accordance with the present invention. The negative rake angle $R_a$ is preferably between −10° and −30°. More preferably, the negative rake angle $R_a$ is between about −12° and −20°. Most preferably, the negative rake angle $R_a$ is between about −12° and −18° in accordance with the present invention. At present, it is believed that a rake angle $R_a$ of −15° is optimal in the knife arrangement 100 of the present invention.

The top and bottom knives 102, 104 are spaced apart horizontally by a clearance gap $C_g$ as illustrated. While specific examples will be discussed hereinafter, the clearance gap $C_g$ between the top and bottom knives 102, 104 in the knife arrangement 100 may be up to about 350% of web material W thickness, which is in contrast to the clearance gap $C_g$ in the standard tangential trimming knife arrangement 10 discussed previously, wherein the clearance gap $C_g$ may be only about 10% of web material W thickness. The top and bottom knives 102, 104 in the knife arrangement preferably have an overlap $O_l$ of between about 25% and 800% of web material W thickness. The overlap $O_l$ range of 25% to 800% of web material W thickness for the top and bottom knives 102, 104 is substantially increased over the standard tangential trimming knife arrangement of FIGS. 2-4, which is limited to about 100% or less of web material W thickness. Further, the top and bottom knives 102, 104 preferably define a cant angle $C_a$ in the range of −0.25° and 1°. The cant angle $C_a$ range of −0.25° and 1° for the knife arrangement 100 is also a substantial improvement over the conventional knife arrangement 10 discussed previously in connection with FIGS. 2-4, wherein the cant angle $C_a$ is limited to the range of between 0° and 0.25°.

Figure 7:
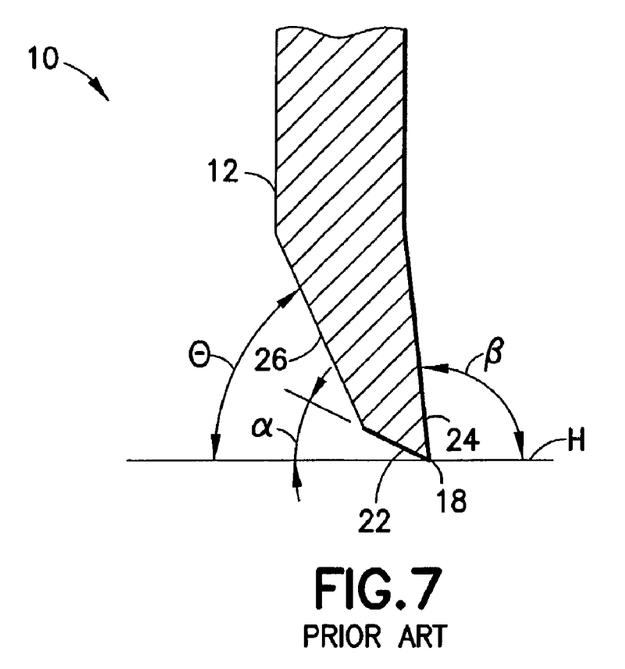
FIG. 7 is a side view of a prior art disk-type top knife used in the prior art knife arrangement of FIG. 5.

Referring to FIG. 7, the prior art top knife 12 (i.e., disk-type knife) used in the known knife arrangement 10 of FIGS. 2-4 is shown in further detail. The top knife 12 currently used in the art has its cutting edge or tip 18 defined by two substantially planar surfaces, including a first surface 22 and a second surface 24. The first and second surfaces 22, 24 define an acute angle therebetween, which forms the cutting edge 18. In the prior art top knife 12, the first surface 22 is formed at an angle α with respect to a substantially horizontal plane H passing through or encompassing the cutting edge 18. The shaft or central axis of the top knife 12 is oriented substantially perpendicular to the substantially horizontal plane H, as illustrated. The angle α in the prior art top knife 12 is an acute angle (i.e., <90°). The second surface 24 is formed at an angle β with respect to the horizontal plane H. The angle β in the top knife 12 currently used in the art is an obtuse angle (i.e., >90°). The top knife 12 further has a third surface 26 formed at an angle θ with respect to the substantially horizontal plane H. The third surface 26 permits debris (i.e., cut material) to clear the top knife 12 during a cutting operation. The angle θ is typically an acute angle in the top knife 12, but may be an obtuse angle.

Figure 8:
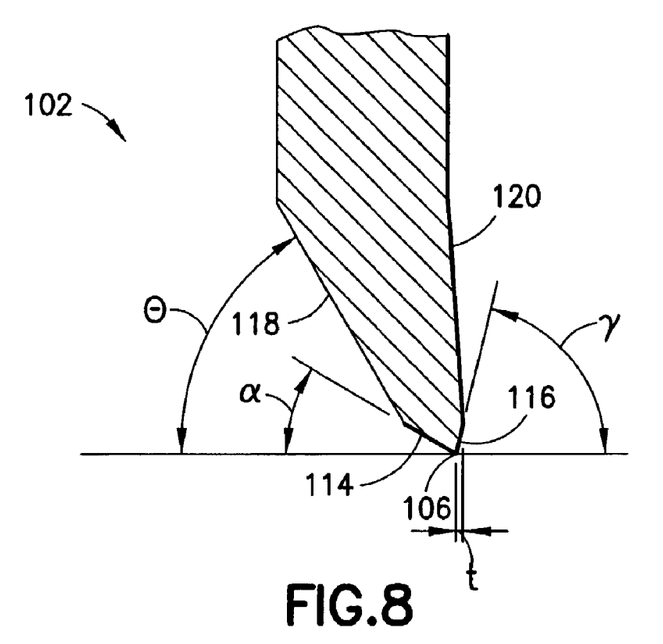
FIG. 8 is a side view of a disk-type top knife in accordance with the present invention and used in the knife arrangement of FIG. 6.

The geometrical configuration of the top knife 102 of the present invention is shown FIG. 8. The same nomenclature used to describe the prior art top knife 12 will generally be used to describe the top knife 102. The top knife 102 is illustrated in FIG. 8 as a disk-type knife. A block-type embodiment of the top knife 102 will be discussed hereinafter in connection with FIG. 10. The cutting edge 106 of the top knife 102 is defined by first and second substantially planar surfaces 114, 116, which define an acute angle therebetween. The first surface 114 is formed at an angle α of between about 10° and 30° with respect to a substantially horizontal plane H passing through or encompassing the cutting edge 106. The shaft or central axis of the top knife 102 is oriented substantially perpendicular to the substantially horizontal plane H, as illustrated. The second surface 116 is truncated or beveled in comparison to the second surface 24 of the prior art top knife 12 shown in FIG. 7. The second surface 116 is formed at a truncated or beveled angle γ of between about 60° and 80° with respect to the substantially horizontal plane H. More preferably, the first surface 114 is formed at an angle α of between about 10° and 20° with respect to the horizontal plane H, and the second surface is formed at an angle γ of between about 70° and 80° with respect to the substantially horizontal plane H. At present, it is believed that an angle α of about 15° and an angle γ of about 60° are optimal in the top knife 102.

The second surface 116 extends a projected distance t as measured along the substantially horizontal plane H. Preferably, the projected distance t is between about 0.001 to 0.080 inch, as measured along the horizontal plane H. More preferably, the second surface 116 may extend a projected distance t of between about 0.003 to 0.060 inch along the substantially horizontal plane.

The top knife 102 further comprises a third surface 118 adjacent the first surface 114. The third surface 118 is formed at an angle θ of between about 45° and 65° with respect to the substantially horizontal plane H. The third surface 118 provides space for cut web material W to clear the cutting edge 106 of the top knife 102 during a cutting, trimming, or slitting operation in a similar manner to the third surface 26 in the prior art top knife 12 of FIG. 7. Additionally, the top knife 102 has a fourth surface 120 formed adjacent the second surface 116, which is used to set or define the negative rake angle $R_a$ at which the top knife 102 is preferably set relative to the bottom knife 104 in the knife arrangement 100 of the present invention, as discussed hereinafter in connection with FIG. 9.

Figure 9:
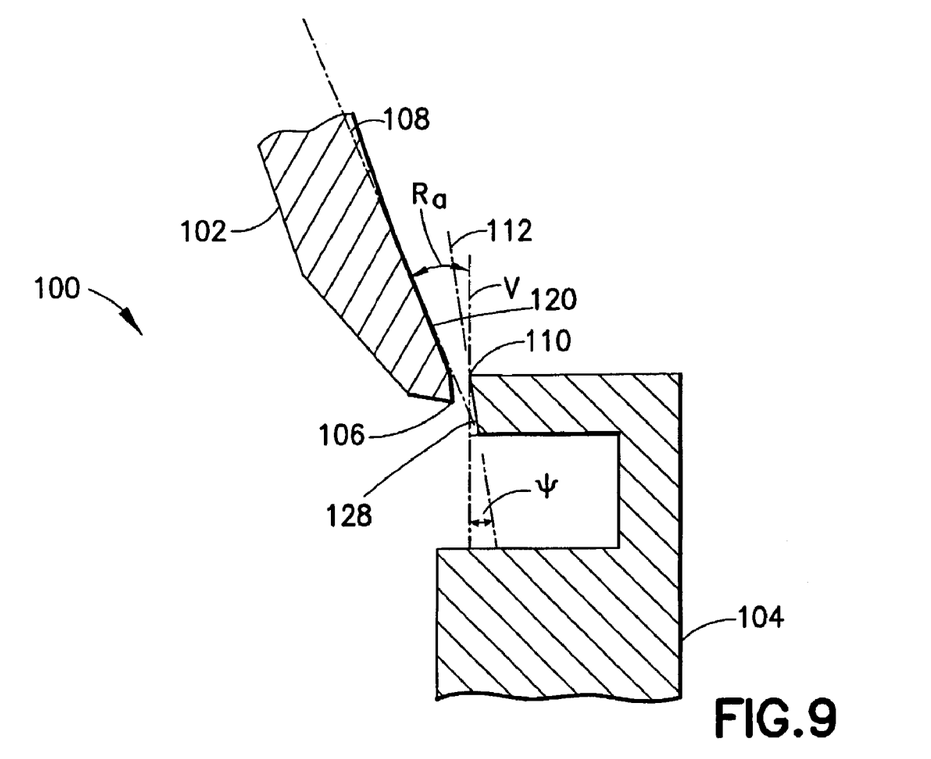
FIG. 9 is a schematic front view of preferred embodiments of the top and bottom knives used in the knife arrangement of FIG. 6.

The geometrical configuration of a preferred embodiment of the bottom knife 104 of the present invention is shown in FIG. 9. Additionally, FIG. 9 illustrates the presently preferred embodiment of the knife arrangement 100. The bottom knife 104 is generally positioned opposite the top knife 102 in the knife arrangement 100. The cutting edge 110 of the bottom knife 104 is preferably formed by a tapered or angled cutting surface 122 that is formed at an angle $\psi$ with respect to the substantially vertical plane V passing through or encompassing the cutting edge 110. The angle $\psi$ is approximately a complimentary angle to the angle $\gamma$ of the top knife 102. In particular, the cutting edge 110 of the bottom knife 104 is defined by the cutting surface 122 tapered or angled an angle $\psi$ of between about 3° and 10° with respect to the substantially vertical plane V passing through the cutting edge 110 of the bottom knife 104.

In FIG. 9, the rake angle $R_a$ between the top and bottom knives 102, 104 is defined in a slightly different manner from the rake angle $R_a$ defined in FIG. 6. In FIG. 9, the top cutting edge plane 108 encompasses the fourth surface 120 of the top knife 102, as shown. Thus, the negative rake angle $R_a$ in FIG. 9 is defined between the fourth surface 120, or body of the top knife 102, and the substantially vertical plane V passing through the cutting edge 110 of the bottom knife 104. The values for the negative rake angle $R_a$ may be the same as identified previously in connection with the schematic knife arrangement 100 of FIG. 6, discussed previously.

The geometrical configuration of a preferred embodiment of the bottom knife 104 of the present invention is shown in FIG. 9. Additionally, FIG. 9 illustrates the presently preferred embodiment of the knife arrangement 100. The bottom knife 104 is generally positioned opposite the top knife 102 in the knife arrangement 100. The cutting edge 110 of the bottom knife 104 is preferably formed by a tapered or angled cutting surface 128 that is formed at an angle $\psi$ with respect to the substantially vertical plane V passing though or encompassing the cutting edge 110. The angle $\psi$ is approximately a complimentary angle to the angle $\gamma$ of the top knife 102. In particular, the cutting edge 110 of the bottom knife 104 is defined by the cutting surface 122 tapered or angled an angle $\psi$ of between about 30° and 10° with respect to the substantially vertical plane V passing through the cutting edge 110 of the bottom knife 104.

Figure 10A:
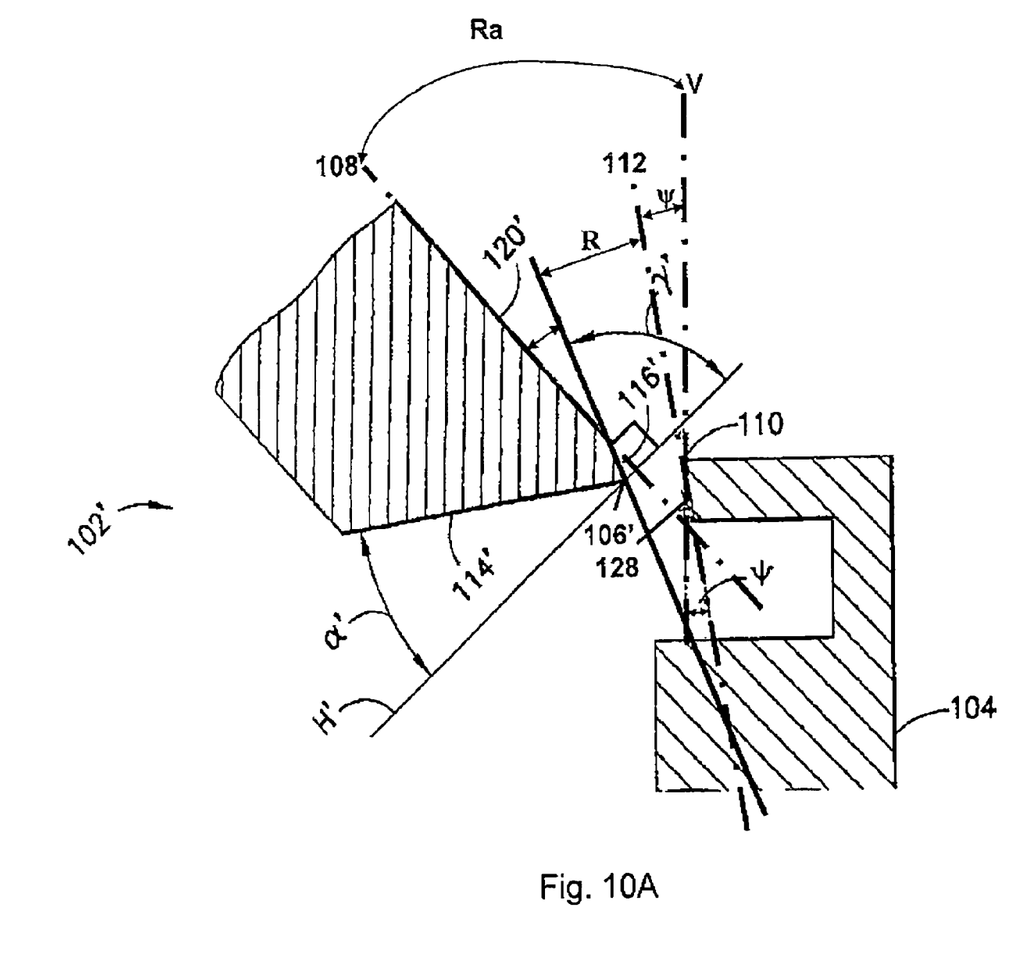
FIG. 10A is a schematic front view of one embodiment of a top block knife and a bottom block knife arrangement.

The second surface 116' extends a projected distance t' along the substantially horizontal plane H'. Preferably, the projected distance t' is between about 0.001 to 0.080 inch, as measured along the horizontal plane H'. More preferably, the second surface 116 may extend a distance t' of between about 0.003 to 0.060 inch along the substantially horizontal plane H'.

Referring to FIGS. 6, 8, and 9, in operation, the web material W is oriented in a substantially horizontal web plane H when passing between the top and bottom knives 102, 104. The web material W is cut between the top and bottom knives 102, 104, with the top and bottom knives 102, 104 generally defining a negative rake angle $R_a$ preferably in the range of between about −10° and −30°. More preferably, the rake angle $R_a$ between the top and bottom knives 102, 104 is in the range of about −12° to −20°, and most preferably in the range of about −15° to −18°. The top and bottom knives 102, 104 may be spaced apart by a clearance gap $C_g$ of up to about 350% of thickness of the web material W. The overlap $O_l$ between the top and bottom knives 102, 104 may be between about 25% and 800% of the thickness of the web material W. Further, the top and bottom knives 102, 104 may define a cant angle $C_a$ in the range of between about −0.25° and 1°. The web material W may be metal sheet, foil, or thin plate (i.e., plate having a thickness of about 1 inch or less. The metal sheet, foil, or thin plate may be aluminum sheet, foil, or thin plate formed of aluminum alloy selected from any alloy in the 1XXX-8XXX series aluminum alloys as designated by the Aluminum Association.

EXAMPLES

The knife arrangement 100 of FIG. 9 was tested for performance on three specific types of aluminum sheet, formed respectively of 1050-H18, 3004-H19, and 5182-H19 aluminum alloys. The thickness of the 1050-H18 aluminum sheet was 0.0058 inch. The thickness of the 3004-H19 aluminum sheet was 0.0108 inch. The thickness of the 5182-H19 aluminum sheet was 0.0085 inch. The coil sizes of the three types aluminum sheet were 24 inch wide and 18 inch in outside diameter. The knife arrangement 100 of the present invention was tested against the standard or conventional knife arrangement 10 shown in FIG. 5 on the three selected types of aluminum sheet.

Figure 11A:
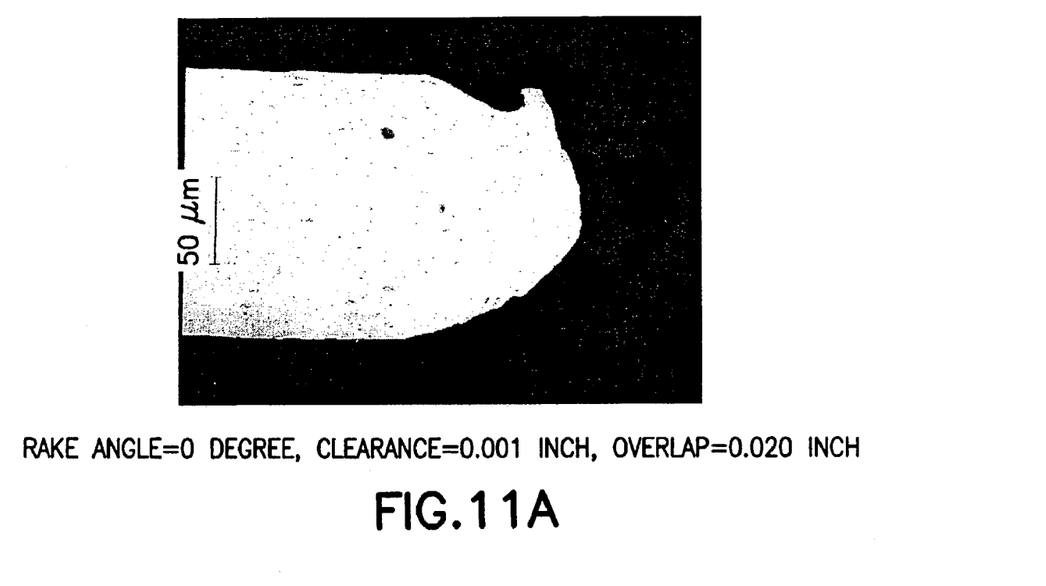
FIG. 11A is a microphotograph showing a trimmed edge of metal sheet material cut in the prior art knife arrangement of FIG. 5.

FIG. 11A shows the results of the standard knife arrangement 10 on the 1050-H18 aluminum sheet having a thickness of 0.0058 inch. FIG. 11A is a microphotograph of the trimmed aluminum sheet. The relevant parameters for the top and bottom knives 12, 14 in the standard knife arrangement 10 were a rake angle $R_a$ of 0°, a clearance gap $C_g$ of 0.001 inch, and an overlap $O_l$ of 0.020 inch. As can be seen in FIG. 11A, even with a small clearance gap $C_g$ the aluminum sheet has a cut edge with a pronounced burr at the cut edge.

Figure 11B:
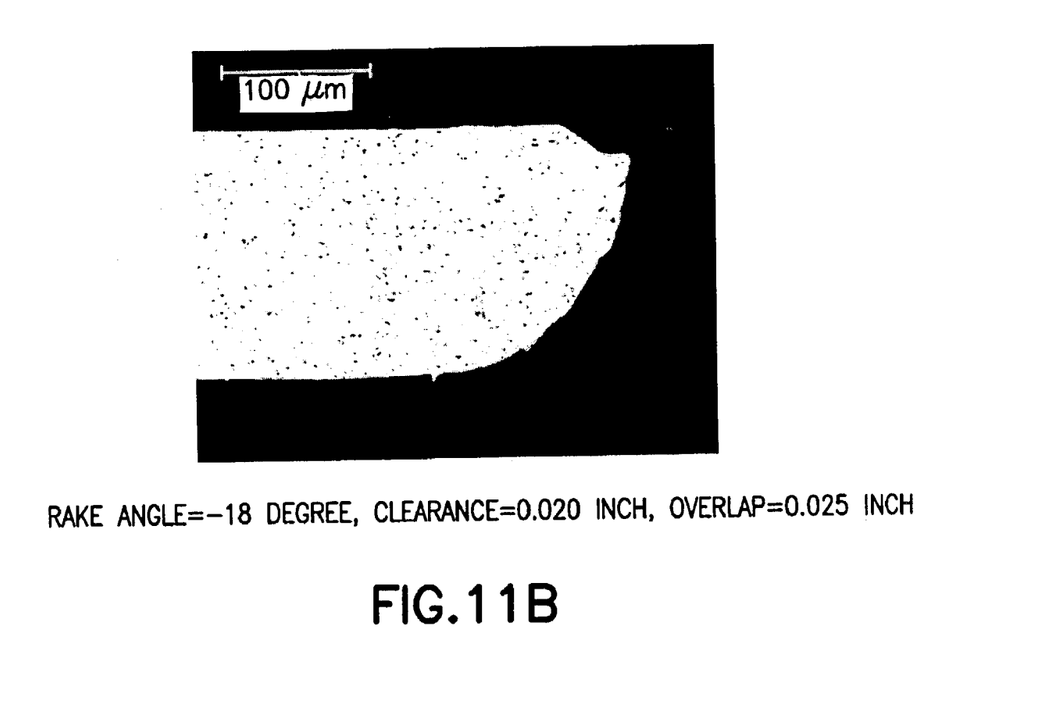
FIG. 11B is a microphotograph showing a trimmed edge of metal sheet material cut in the knife arrangement in accordance with the present invention shown in FIG. 6.
Figure 12A:
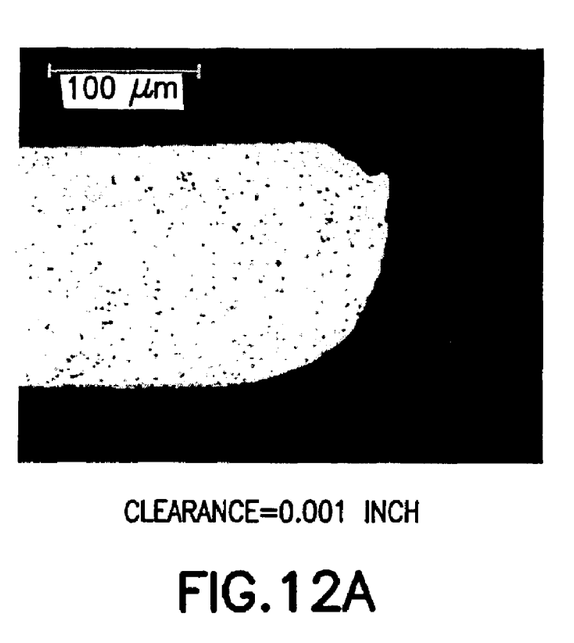
FIG. 12A is a microphotograph of a trimmed edge of metal sheet material cut in the knife arrangement of FIG. 6, with the top and bottom knives defining a clearance gap of 0.001 inch.
Figure 12B:
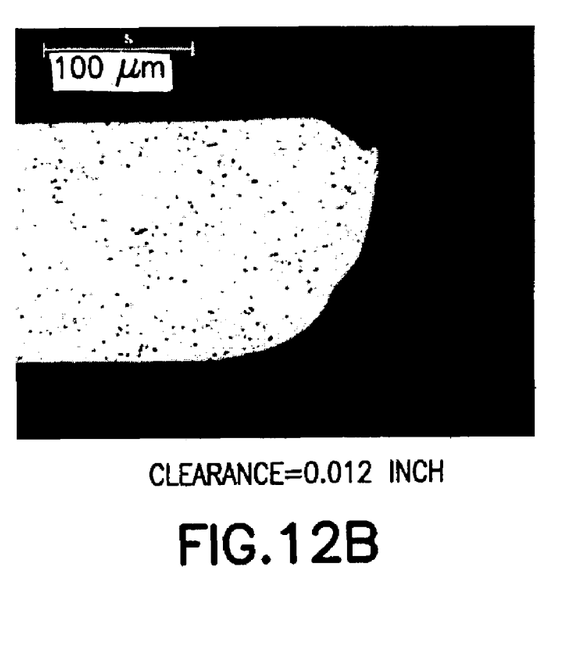
FIG. 12B is a microphotograph of a trimmed edge of metal sheet material cut in the knife arrangement of FIG. 6, with the top and bottom knives defining clearance gap of 0.012 inch.
Figure 12C:
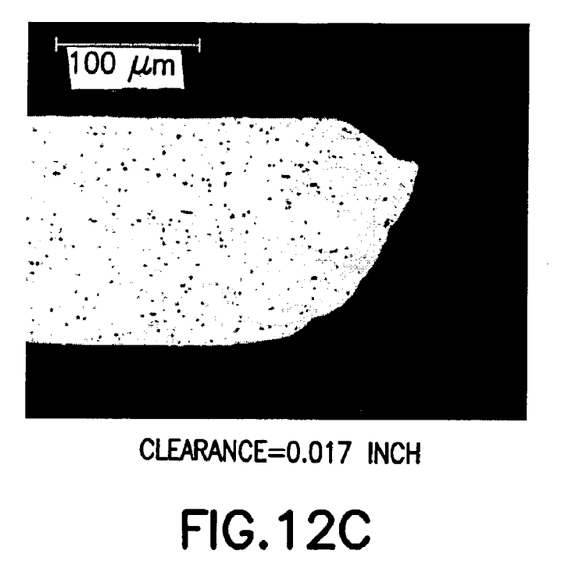
FIG. 12C is a microphotograph of a trimmed edge of metal sheet material cut in the knife arrangement of FIG. 6, with the top and bottom knives defining a clearance gap of 0.017 inch.
Figure 12D:
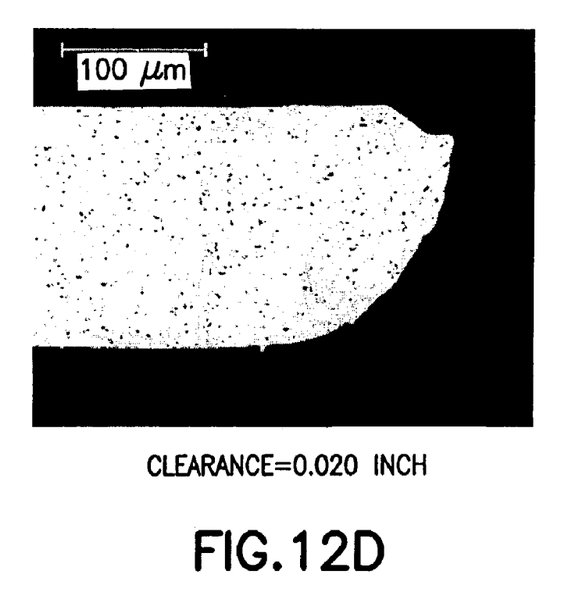
FIG. 12D is a microphotograph of a trimmed edge of metal sheet material cut in the knife arrangement of FIG. 6, with the top and bottom knives defining clearance gap of 0.020 inch.

FIG. 11B shows a microphotograph of trimmed 1050-H18 aluminum sheet produced by the knife arrangement 100 of the present invention and as illustrated in FIG. 9. The relevant perimeters for the top and bottom knives 102, 104 in the knife arrangement 100 were a rake angle $R_a$ of −18°, a clearance gap $C_g$ of 0.020 inch, and an overlap $O_l$ of 0.025 inch. As will be appreciated when viewing FIG. 11B in comparison to FIG. 11A, the trimmed edge produced by the standard knife arrangement 10 includes a significant burr while the trimmed edge produced by the knife arrangement 100 of the present invention has a relatively clean edge, which is substantially free of burrs, fines, debris, and slivers. The clearance gap $C_g$ in the knife arrangement 100 of the present invention was 20 approximately times that used in the conventional knife arrangement 10 of FIG. 5. Additionally, the overlap $O_l$ in the knife arrangement 100 is substantially larger than the overlap $O_l$ used in the knife arrangement 10. It is generally accepted in the art that larger overlap $O_l$ produces larger burr height. The results provided by the knife arrangement 100 of the present invention contradicts this commonly accepted principle in the art. If the clearance gap $C_g$ values used in the knife arrangement 100 identified hereinabove are used in the prior art knife arrangement 10, the trimming or slitting process will fail in the knife arrangement 10.

FIGS. 12A-12D show microphotographs of four cut edge profiles produced by the knife arrangement 100 of the present invention. The common parameters for the knife arrangement 100 used to form the cut edge profiles shown in FIGS. 12A-12D include a rake angle $R_a$ of −18° and an overlap $O_l$ of 0.025 inch. The 1050-H18 aluminum sheet having a thickness of 0.0058 inch was again cut in the knife arrangement 100 at four different clearance gap $C_g$ values for the top and bottom knives 102, 104. The cut edge profile shown in FIG. 12A was produced with the top and bottom knives 102, 104 having a clearance gap $C_g$ of 0.001 inch. The cut edge profile shown in FIG. 12B was produced with the top and bottom knives 102, 104 having a clearance gap $C_g$ of 0.012 inch. The cut edge profile shown in FIG. 12C was produced with the top and bottom knives 102, 104 having a clearance gap $C_g$ of 0.017 inch. Finally, the cut edge profile shown in FIG. 12D was produced with the top and bottom knives 102, 104 having a clearance gap $C_g$ of 0.020 inch. As will be appreciated by those skilled in the art, the burr height in each microphotograph shown in FIGS. 12A-D remains substantially zero. This remains true even though the clearance gap $C_g$ is 20 times larger in knife arrangement 100 used to produce the cut edge profile shown in FIG. 12D relative to the clearance gap $C_g$ in the knife arrangement 100 used to produce the cut edge profile shown in FIG. 12A. As indicated previously, the clearance gap $C_g$ in the conventional or standard knife arrangement 10 is typically on the order of 10% or less of the thickness of the web material W. The clearance gap $C_g$ available in the knife arrangement 100 of the present invention may be on the order of 350% of web material W thickness.

Figure 13:
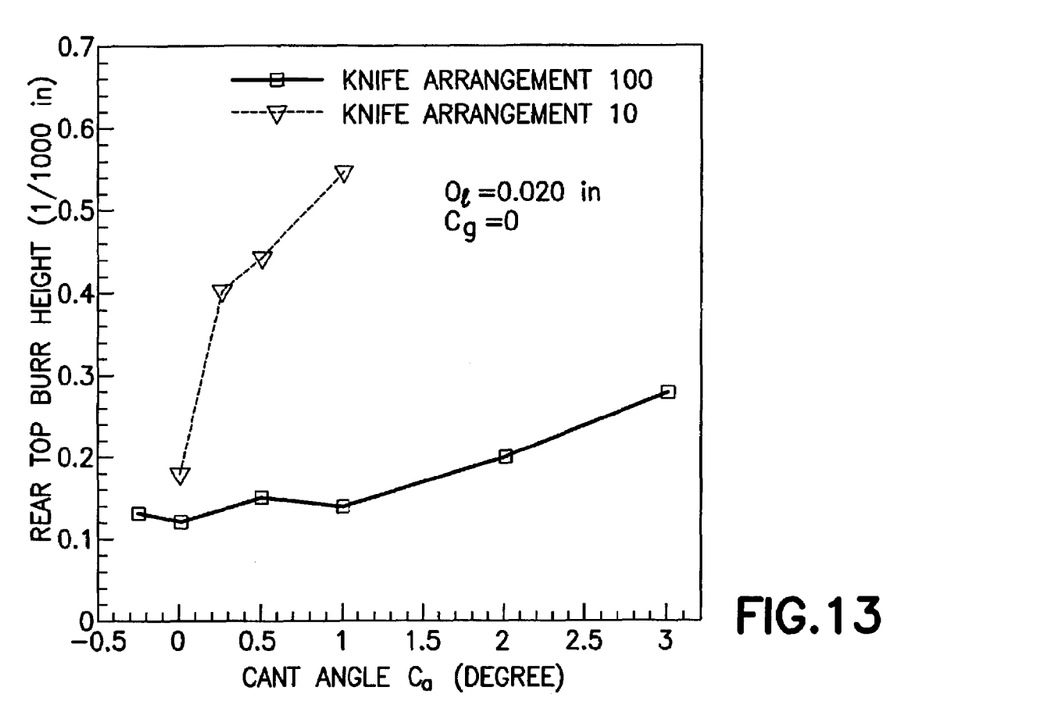
FIG. 13 is graph showing the effects of cant angle on burr height in cut metal sheet material.
Figure 14:
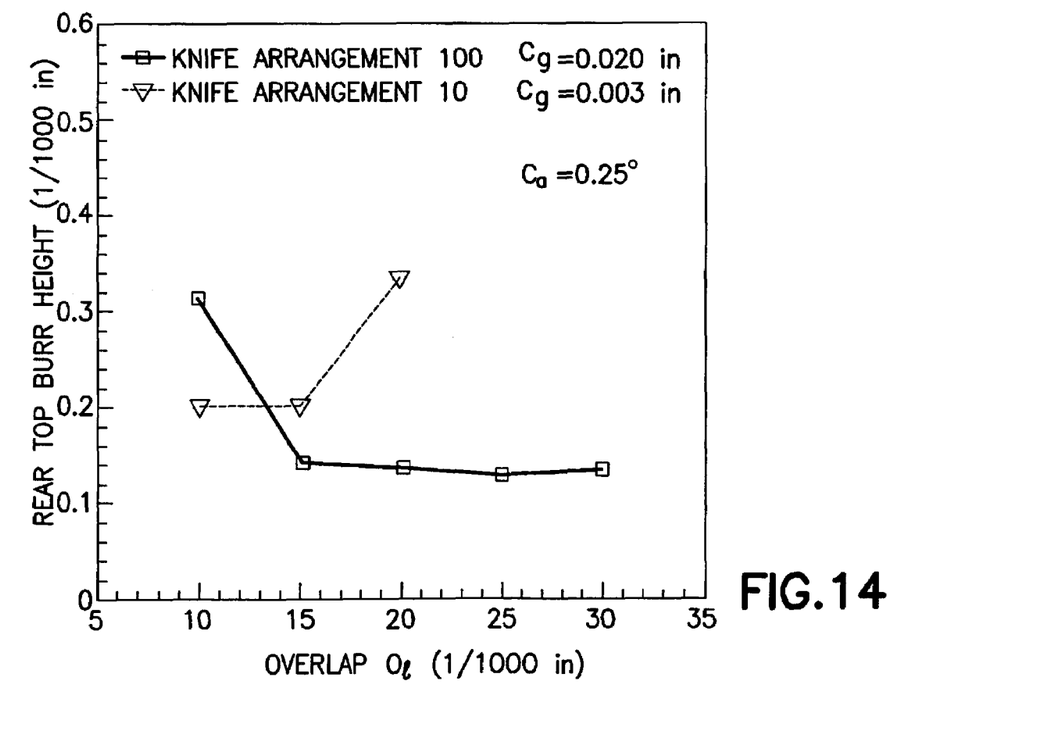
FIG. 14 is a graph showing the effects of overlap on burr height in cut metal sheet material.

FIG. 13 shows a comparison of the effects of cant angle $C_a$ on burr height between the standard or conventional knife arrangement 10 of FIG. 5, and the knife arrangement 100 of the present invention shown in FIG. 9. In the standard knife arrangement 10, burr height increases dramatically after the cant angle $C_a$ reaches 0.25° or larger. However, burr height is relatively insensitive to cant angle $C_a$ in the knife arrangement 100 of the present invention. FIG. 14 shows a comparison of the effects of overlap $O_l$ on burr height between the standard or conventional knife arrangement 10 and the knife arrangement 100 of the present invention. Under the current knife arrangement 10, burr height increases dramatically after overlap $O_l$ reaches 0.015 inch. In contrast, burr height is relatively insensitive to overlap $O_l$ when using the knife arrangement 100 of the present invention.

While preferred embodiments of the present invention were described hereinabove, obvious modifications and alterations of the present invention may be made without departing from the spirit and scope of the present invention. The scope of the present invention is defined in the appended claims and equivalents thereto.

The invention claimed is:

1. A block knife arrangement comprising:

a top block knife and an bottom block knife oriented in opposing quadrants defining a gap therebetween for trimming a web passing therethrough;

wherein the bottom block knife comprises a cutting edge and an angled cutting surface coincident with a cutting edge plane, a substantially vertical plane that is coincident with the cutting edge, wherein the cutting edge plane and the substantially vertical plane being oriented relative to each other to form an acute angle $\psi$ being greater than 0 degrees;

wherein the top block knife comprises substantially parallel side surfaces, a cutting edge defined by first and second substantially planar edge surfaces adjacent the substantially parallel side surfaces, a cutting edge plane coincident with at least one side of the substantially parallel side surfaces, an angle formed by the at least one side and the second substantially planar edge surface determined using a mathematical equation (90″−γ′), wherein γ′ is an acute angle formed by the second substantially planar edge surface with respect to a substantially horizontal plane oriented perpendicular to the at least one side; and a relative angle formed by the second substantially planar edge surface with respect to the bottom knife angled cutting surface determined using a mathematical equation (a Negative Rake Angle+(90″−γ′)+ψ), wherein the Negative Rake Angle is an acute angle formed by the substantially vertical plane with respect to the at least one side, wherein the Negative Rake Angle ranges from about −10° to about −30°, γ′ ranges from about 60″ to 80″, ψ ranges from about 3° to 10°, such that when the relative angle equals zero, the second substantially planar edge surface and the bottom knife angled cutting surface are parallel with each other, whereby the top block knife is tilted away from a discarded material of the web.

2. The block knife arrangement of claim 1, wherein the first substantially planar edge surface is formed at an angle α of between about 10° and 20° with respect to the substantially horizontal plane.

3. The block knife arrangement of claim 1, wherein the second substantially planar edge surface extends a projected distance t of between about 0.003 to 0.060 inch along the substantially horizontal plane.

* * * * *

UNITED STATES PATENT AND TRADEMARK OFFICE
CERTIFICATE OF CORRECTION

PATENT NO. : 7,455,004 B2  Page 1 of 1
APPLICATION NO. : 10/383180
DATED : November 25, 2008
INVENTOR(S) : Ming M. Li et al.

It is certified that error appears in the above-identified patent and that said Letters Patent is hereby corrected as shown below:

On the title page, Item (56) References Cited, under U.S. PATENT DOCUMENTS, 7th reference, delete "3,570,353" and insert -- 3,570,363 --.

On the title page, Item (56) References Cited, under U.S. PATENT DOCUMENTS, 13th reference, delete "4,271,319" and insert -- 4,274,319 --.

In column 9, line 46, after 'about', delete "30°" and insert -- 3° --.

Signed and Sealed this

Twenty-seventh Day of January, 2009

JOHN DOLL
*Acting Director of the United States Patent and Trademark Office*